US012452392B2

(12) United States Patent
Nohara et al.

(10) Patent No.: US 12,452,392 B2
(45) Date of Patent: Oct. 21, 2025

(54) VEHICLE DISPLAY CONTROL DEVICE AND NON-TRANSITORY COMPUTER-READABLE MEDIUM

(71) Applicant: DENSO CORPORATION, Kariya (JP)

(72) Inventors: Masafumi Nohara, Kariya (JP); Haozhou Li, Kariya (JP); Taro Kobayashi, Kariya (JP); Asaki Umezawa, Kariya (JP); Yo Kitamura, Kariya (JP); Jinhae Choi, Kariya (JP)

(73) Assignee: DENSO CORPORATION, Kariya (JP)

( * ) Notice: Subject to any disclaimer, the term of this patent is extended or adjusted under 35 U.S.C. 154(b) by 147 days.

(21) Appl. No.: 18/535,533

(22) Filed: Dec. 11, 2023

(65) Prior Publication Data

US 2024/0106989 A1 Mar. 28, 2024

Related U.S. Application Data

(63) Continuation of application No. PCT/JP2022/021393, filed on May 25, 2022.

(30) Foreign Application Priority Data

Jun. 25, 2021 (JP) .................................. 2021-105741

(51) Int. Cl.
*H04N 7/18* (2006.01)
*B60R 1/23* (2022.01)
(Continued)

(52) U.S. Cl.
CPC ............... *H04N 7/183* (2013.01); *B60R 1/23* (2022.01); *G06V 20/58* (2022.01); *G06V 20/64* (2022.01);
(Continued)

(58) Field of Classification Search
CPC ...... H04N 7/183; H04N 23/69; H04N 5/2628; G06V 20/58; G06V 20/64; B60R 1/23; B60R 2300/306
(Continued)

(56) References Cited

U.S. PATENT DOCUMENTS

2007/0067103 A1 3/2007 Fukumoto et al.
2015/0093547 A1 4/2015 Orologio
(Continued)

FOREIGN PATENT DOCUMENTS

JP 2003294457 A 10/2003
JP 2006-098924 A 4/2006
(Continued)

*Primary Examiner* — Allen C Wong
(74) *Attorney, Agent, or Firm* — Harness, Dickey & Pierce, P.L.C.

(57) ABSTRACT

A surrounding information acquisition unit is configured to acquire surrounding information around a subject vehicle. A vehicle speed acquisition unit is configured to acquire a subject vehicle speed. A display control unit is configured to cause a display device to display a surrounding image indicating the surrounding information and a subject vehicle image indicating the subject vehicle. The display control unit is configured to, when the subject vehicle speed is low, set a display scale to telescopic and cause the display device to display the surrounding image and the subject vehicle image. The display control unit is configured to, when the subject vehicle speed is high, set the display scale to a wide angle and cause the display device to display the surrounding image and the subject vehicle image.

12 Claims, 8 Drawing Sheets

(51) Int. Cl.
     *G06V 20/58*   (2022.01)
     *G06V 20/64*   (2022.01)
     *H04N 5/262*   (2006.01)
     *H04N 23/69*   (2023.01)

(52) U.S. Cl.
     CPC .......... *H04N 5/2628* (2013.01); *H04N 23/69* (2023.01); *B60R 2300/306* (2013.01)

(58) Field of Classification Search
     USPC ....................................................... 348/148
     See application file for complete search history.

(56) References Cited

U.S. PATENT DOCUMENTS

| | | | |
|---|---|---|---|
| 2017/0230595 A1* | 8/2017 | Ono | G03B 19/023 |
| 2017/0309056 A1 | 10/2017 | Uchinoumi et al. | |
| 2018/0157038 A1* | 6/2018 | Kabe | G02B 27/0101 |
| 2022/0377299 A1 | 11/2022 | Ishii et al. | |
| 2023/0373309 A1 | 11/2023 | Kume et al. | |

FOREIGN PATENT DOCUMENTS

| | | | |
|---|---|---|---|
| JP | 2007058093 A | 3/2007 |
| JP | 2011052960 A | 3/2011 |
| JP | 2016134009 A | 7/2016 |
| JP | 2017227477 A | 12/2017 |
| JP | 6466899 B2 | 2/2019 |
| JP | 6692981 B1 | 5/2020 |
| JP | 2022121370 A | 8/2022 |

\* cited by examiner

VEHICLE DISPLAY CONTROL DEVICE AND NON-TRANSITORY COMPUTER-READABLE MEDIUM

CROSS REFERENCE TO RELATED APPLICATION

The present application is a continuation application of International Patent Application No. PCT/JP2022/021393 filed on May 25, 2022, which designated the U. S. and claims the benefit of priority from Japanese Patent Application No. 2021-105741 filed on Jun. 25, 2021. The entire disclosures of all of the above applications are incorporated herein by reference.

TECHNICAL FIELD

The present disclosure relates to a vehicle display control device and a non-transitory computer-readable medium storing a vehicle display control program.

BACKGROUND

Conventionally, a known vehicle device acquires peripheral information around a subject vehicle recognized by a peripheral monitoring sensor such as a camera unit or a millimeter wave radar.

SUMMARY

According to an aspect of the present disclosure, a vehicle display control device comprises: a surrounding information acquisition unit configured to acquire surrounding information around a subject vehicle; a vehicle speed acquisition unit configured to acquire a subject vehicle speed; and a display control unit configured to cause a display device to display a surrounding image indicating the surrounding information and a subject vehicle image indicating the subject vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
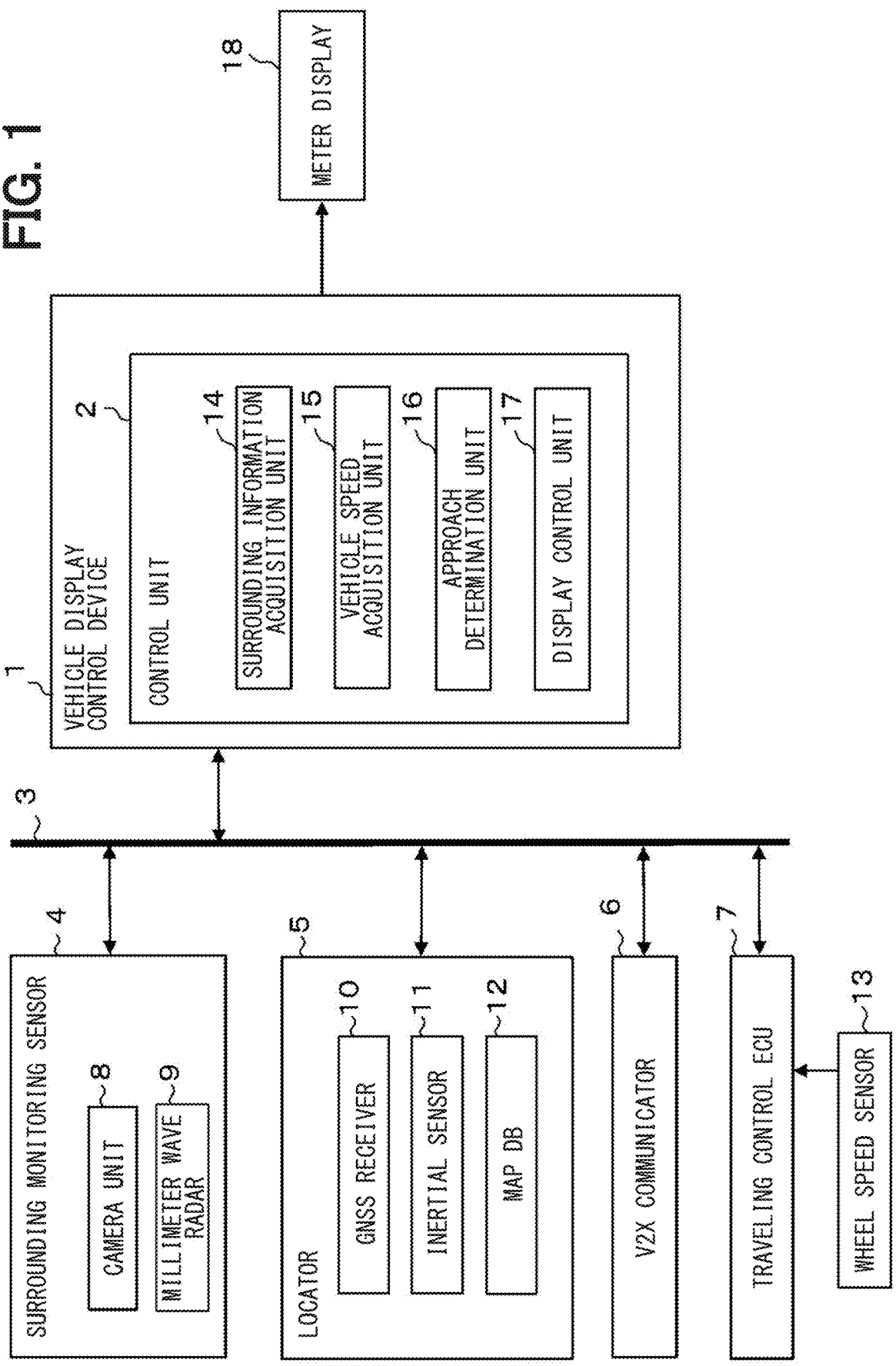
FIG. 1 is a block diagram showing an embodiment of the present disclosure.

Hereinafter, examples of the present disclosure will be described.

According to an example of the present disclosure, a vehicle display control device acquires surrounding information about the surroundings of a subject vehicle. The information is recognized by a surrounding monitoring sensor such as a camera unit and a millimeter wave radar. The vehicle display control device causes a display device to display a surrounding image indicating the surrounding information and a subject vehicle image indicating the subject vehicle.

A vehicle display control device according to an example of the present disclosure changes a scale of the display correspondingly for each road type in order to support the driver to recognize the travelling environment around the vehicle. However, when the scale of the display is in a wide angle, detailed information about the travelling environment around the vehicle may be hardly presented to the driver.

According to an example of the present disclosure, a vehicle display control device comprises: a surrounding information acquisition unit configured to acquire surrounding information around a subject vehicle; a vehicle speed acquisition unit configured to acquire a subject vehicle speed; and a display control unit configured to cause a display device to display a surrounding image indicating the surrounding information and a subject vehicle image indicating the subject vehicle. The display control unit is configured to, when the subject vehicle speed is low, set a display scale to telescopic and cause the display device to display the surrounding image and the subject vehicle image. The display control unit is configured to, when the subject vehicle speed is high, set the display scale to a wide angle and cause the display device to display the surrounding image and the subject vehicle image.

This example is configured to, when the subject vehicle speed is low, set the display scale to telescopic and cause the display device to display the surrounding image and the subject vehicle image. This example sets the display scale to the telescopic, thereby to enable to present detailed information about the travelling environment around the vehicle to the driver. When the subject vehicle speed increases, and in a case where the display scale is left to telescopic, display of the surrounding images may move quickly, and a front display distance may become short. Therefore, enough leeway may not be allowed for the driving operation. The example is configured to, when the subject vehicle speed is high, set the display scale to a wide angle and cause the display device to display the surrounding image and the subject vehicle image. This example enables to reduce irritation caused by movement of the display of the surrounding image. In addition, this example enables to ensure a long front display distance. This example enables to present, in addition to the traveling environment around the subject vehicle, the traveling environment at a distance to the driver. This example enables to present the travelling environment around the subject vehicle appropriately to the driver.

Hereinafter, an embodiment will be described with reference to the drawings. The present embodiment exemplifies a vehicle equipped with an automated driving configuration. It is noted that, the present embodiment can also be applied to a vehicle that is not equipped with an automated driving configuration. For example, a vehicle display control device 1 installed in a vehicle such as an automobile includes a control unit 52. The control unit 52 is provided by a microcomputer including a CPU (Central Process Unit), a ROM (Read Only Memory), a RAM (Random Access Memory), and an I-O (Input-Output). The microcomputer implements a process corresponding to a computer program by executing the computer program stored in a non-transitory tangible storage medium, and controls overall operations of the vehicle display control device 1. The microcomputer has the same meaning as a processor. The non-transitory tangible storage media may share its hardware with another computer resource.

The control unit 2 has a driving assistance function that supports a driving operation of a driver and an automated driving function that is configured to perform the driving operation of the driver. That is, a vehicle equipped with the vehicle display control device 1 is capable of automated driving by activating the automated driving function. The driving assistance function described above corresponds to the automated driving function of level 2 or lower in an automated driving level defined by Society of Automotive Engineers of America. In the automated driving of the level 2 or lower, the driver is obliged to monitor surroundings. On the other hand, the automated driving function corresponds to the automated driving function of level 3 or higher in which a system is a control subject. The automated driving at level 3 or higher is an eyes-off automated driving, where the driver is not obligated to monitor the surroundings. During a period of the automated driving using the automated driving function of level 3 or higher, the driver is permitted to perform a specific action other than a predetermined driving.

The vehicle display control device 1 is connected as one node to a communication bus 3 of a vehicle network. A surrounding monitoring sensor 4, a locator 5, a V2X (vehicle to everything) communication device 6, a travel control ECU (electronic control unit) 7, and the like are connected as nodes to the communication bus 3. The nodes connected to the communication bus 3 are configured to perform data communications with each other via the communication bus 3. The nodes may be configured to perform data communications with each other without using the communication bus 3.

The surroundings monitoring sensor 4 is an autonomous sensor configured to monitor a travelling environment around the subject vehicle, and includes, for example, a plurality of camera units 8 and a plurality of millimeter wave radars 9. The camera unit 8 includes a monocular camera or a compound eye camera, and images the surroundings of the subject vehicle including a front region, a rear region, and left and right regions of the subject vehicle. The camera unit 8 sends captured image data, as detection information, to the vehicle display control device 1 and the like. The camera unit 8 may, instead of sending the imaging data, analyze the image data to generate analysis data, and may send the generated analysis data as detection information to the vehicle display control device 1 and the like. The millimeter wave radar 9 irradiates a millimeter wave or a sub-millimeter wave toward the surroundings of the subject vehicle. The millimeter wave radar 9 sends, as detection information, the received data, which indicates a reception status of a reflected wave reflected on a moving object and a stationary object around the subject vehicle, to the vehicle display control device 1 and the like. The surrounding monitoring sensor 4 may include, in addition to the camera unit 8 and the millimeter wave radar 9, a lidar (LiDAR: Light Detection and Ranging, Laser Imaging Detection and Ranging), a sonar, and the like.

The locator 5 includes a GNSS (Global Navigation Satellite System) receiver 10, an inertial sensor 11, and a map database 12. The locator 5 combines a positioning signal received by the GNSS receiver 10, a measurement result of the inertial sensor 11, vehicle speed information, and the like. The locator 5 sequentially determines a position and a traveling direction of the subject vehicle. The locator 5 performs positioning and sends locator information, which includes subject vehicle position information indicating the position of the subject vehicle and traveling direction information indicating the traveling direction, to the vehicle display control device 1, and the like. The map database 12 is mainly composed of a large-capacity storage medium that stores a large amount of three-dimensional map data and two-dimensional map data. The three-dimensional map data includes information necessary for advanced driving assistance and automated driving, such as shape information in a three-dimensional shape of a road and detailed information on each lane. The locator 5 reads map data around the vehicle from the map database 12 and sends the map data as read to the vehicle display control device 1 and the like.

The V2X communication device 6 is an external communication unit, and performs, for example, vehicle-to-vehicle communications, road-to-vehicle communications, cellular communications, and the like. The V2X communication device 6 performs vehicle-to-vehicle communications with a V2X communication device of another vehicle, and performs road-to-vehicle communications with a roadside communication device. In this way, the V2X communication device 6 receives, for example, information indicating a relative position of a target (for example, another vehicle such as a preceding vehicle and a following vehicle) and a warning target (for example, a pedestrian, a bicycle, and the like) around the subject vehicle. The V2X communication device 6 receives map data around the vehicle from a map data server by performing cellular communications with the map data server.

The travel control ECU 7 has the functions of a brake control ECU, a drive control ECU, and a steering control ECU. The travel control ECU 7 continuously performs a brake control of each wheel, an output control of a onboard power source, and a steering angle control, based on either an operation command caused by a driving operation of the driver or a control command input from the vehicle display control device 1. The travel control ECU 7 inputs a detection signal from a wheel speed sensor 13 provided to a hub portion of each wheel, generates vehicle speed information, which indicates a current traveling speed of the subject vehicle based on the detection signal as input, and sends the vehicle speed information as generated to the vehicle display control device 1 and the like.

The control unit 2 includes a surrounding information acquisition unit 14, a vehicle speed acquisition unit 15, an approach determination unit 16, and a display control unit 17. Each of these units 12 to 15 corresponds to an operation executed by a vehicle display control program. That is, the control unit 2 performs the operations of the units 14 to 17 by executing a vehicle display control program.

The surrounding information acquisition unit 14 receives detection information, which is sent from the surrounding monitoring sensor 4, and acquires surrounding information around the subject vehicle. The vehicle speed acquisition unit 15 receives vehicle speed information, which is sent from the travel control ECU 7, and acquires the vehicle speed.

The approach determination unit 16 receives locator information sent from the locator 5, The approach determination unit 16 compares the vehicle position information and the traveling direction information, which are included in the locator information as received, with a guidance route from the current position to a destination, which is set by using a navigation function. The approach determination unit 16 determines whether the subject vehicle approaches a route guidance point. The approach determination unit 16 determines that the position of the subject vehicle is approaching the route guidance point based on determination that, for example, when the position of the subject vehicle is within a predetermined distance from a right turn point on the guidance route and that the traveling direction is toward the right turn point.

Figure 2:
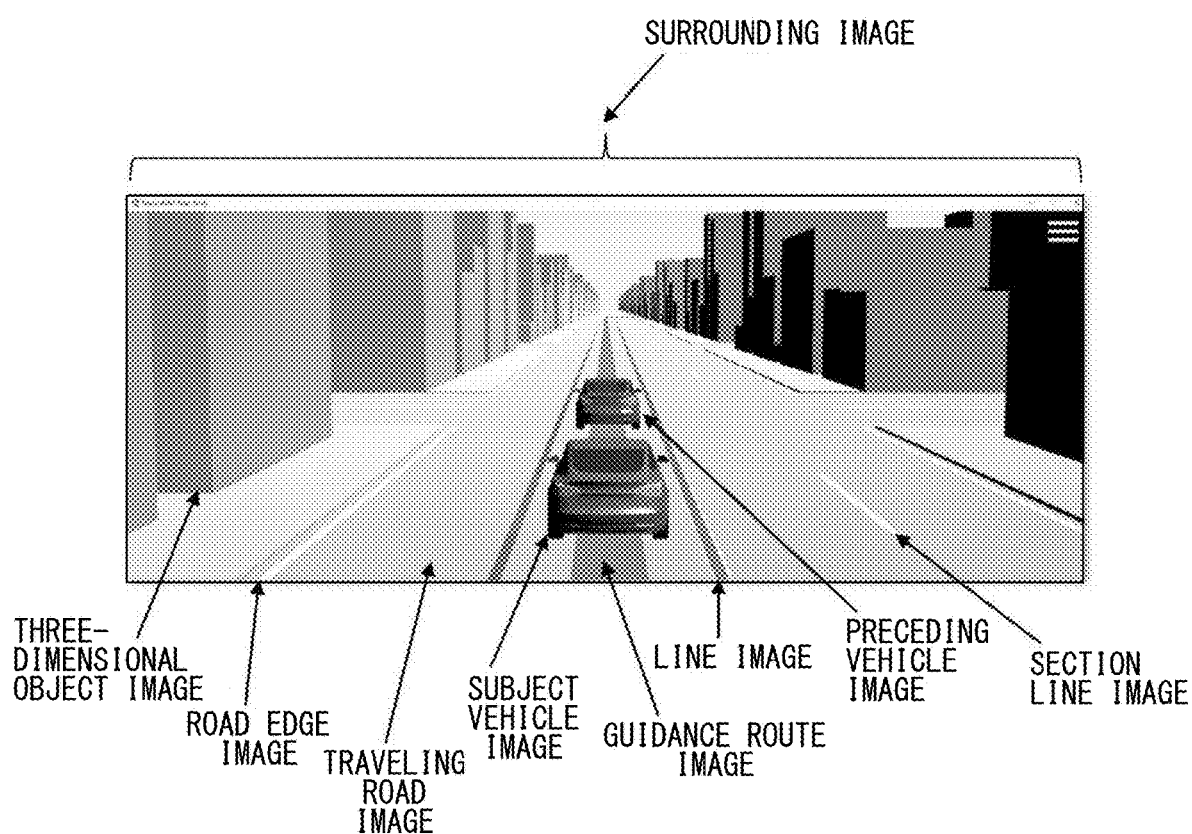
FIG. 2 is a view showing a surrounding image and a subject vehicle image.

The display control unit 17 outputs a display command signal to the meter display 18. As shown in FIG. 2, The display control unit 17 displays on the meter display 18 a surrounding image showing surrounding information and an subject vehicle image showing the subject vehicle. The meter display 18 is mainly includes a liquid crystal display or an organic EL (Electro-Luminescence). The meter display 18 corresponds to a display device. Note that, instead of the meter display 18, a center information display (CID) or a head-up display (HUD) may be used as the display device. A configuration using the head-up display projects a light of an image, which is to be formed in front of the driver, onto a projection area of the windshield, thereby, to enable the driver to recognize the image as a virtual image that overlaps with a foreground of the subject vehicle.

The surrounding image is an image that visualizes a travelling environment around the subject vehicle monitored by the surrounding monitoring sensor 4 in real time. The surrounding image is an image in which the travelling environment around the subject vehicle is reproduced in a bird's-eye view from the behind of the subject vehicle. The surrounding image is displayed as a three-dimensional image or a 2D image, in which an object, which is equivalent to a roads and a three-dimensional object, is laid out in a virtual modeling space, and in which a group of the objects are taken from a virtual camera position. The surrounding image includes a traveling road image showing a road on which the vehicle travels, a preceding vehicle image showing a preceding vehicle ahead of the subject vehicle, a section line image showing a section line painted on the road surface, a road edge image showing a road edge, a guidance route image showing a guidance route, a line image showing a line for lane keep, a three-dimensional object images showing a three-dimensional object, and the like. The three-dimensional object includes all objects that are erected from the ground, such as a building, a traffic light, a road sign, and the like.

The image of the subject vehicle is displayed in a mode in which an external shape of the top and the rear of the subject vehicle is imitated at a position slightly below the center of the surrounding image. That is, the surrounding image is displayed in a wide region in the traveling direction of the subject vehicle. The surrounding image is displayed in a narrow region in the opposite direction to the traveling direction of the vehicle. In this way, the traveling road image, the preceding vehicle image, the section line image, the road edge image, the guidance route image, the line image, the three-dimensional object image, and the like are displayed around the subject vehicle image. Thus, the display enables the drive to recognize the traveling environment around the subject vehicle. Note that, the traveling road image, the section line image, the road edge image, the guidance route image, and the line image are displayed using the shape information of the road. The subject vehicle image is the same as a subject vehicle icon.

The display control unit 104 has, as a function when displaying the surrounding image and the subject vehicle image on the meter display 18, a function that changes a display scale according to the speed of the subject vehicle and a function that changes a display mode according to approach of the subject vehicle to the route guidance point. Each function will be explained in turn below.

(1) Function to Change Display Scale According to Speed of Subject Vehicle

Figure 3:
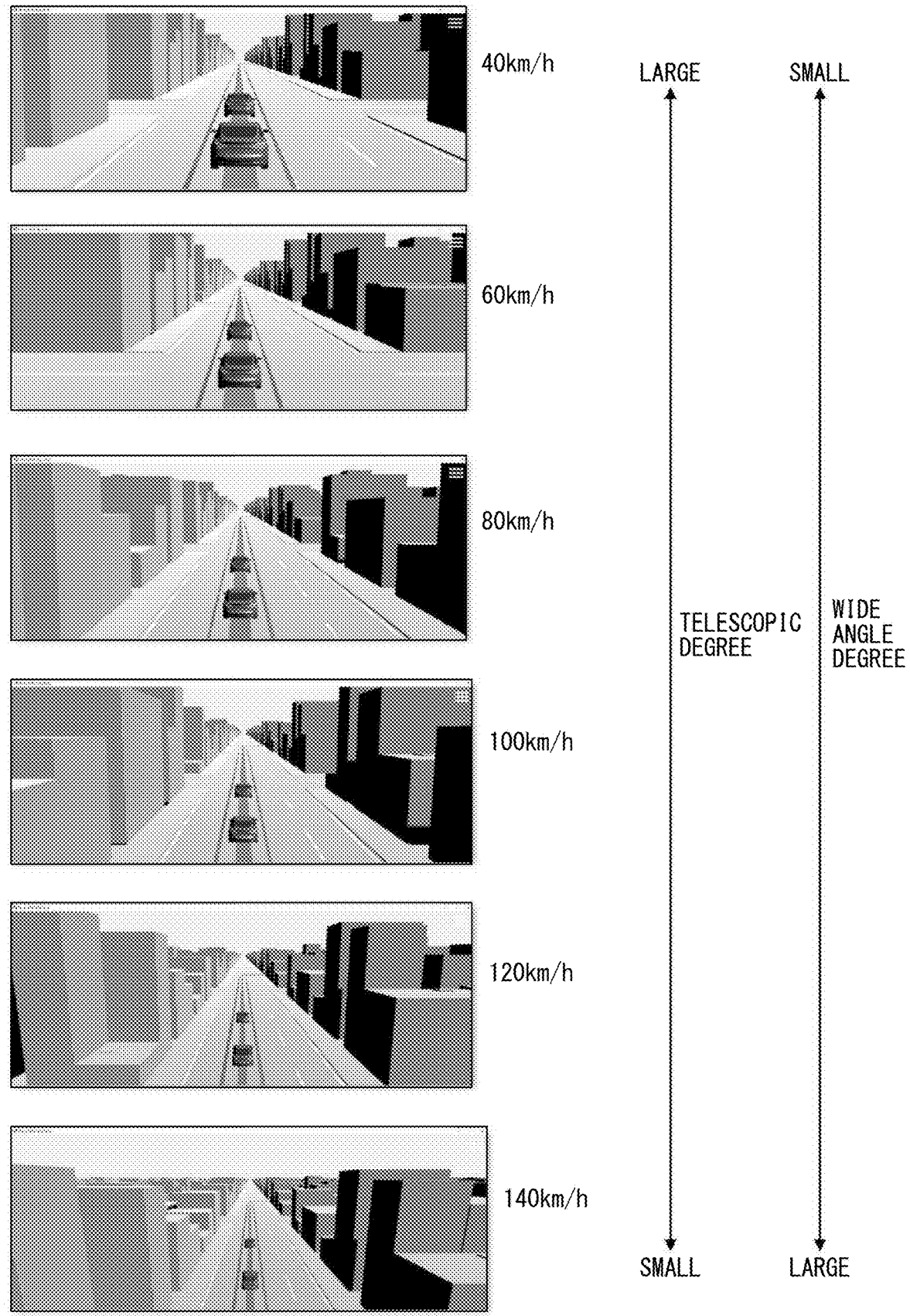
FIG. 3 is a view showing a mode that changes a scale of indication according to a speed of the subject vehicle.

As shown in FIG. 3, the display control unit 17 sets a display scale to telescopic when the subject vehicle speed is low and sets the display scale to a wide angle when the subject vehicle speed is high. Specifically, the display control unit 17 is configured to linearly change the display scale. The display control unit 17 decreases a telescopic degree and increases a wide angle degree when the vehicle speed increases. The display control unit 17 increases the telescopic degree and decreases the wide angle when the subject vehicle speed decreases. The telescopic degree is an index indicating a degree of a telescopic level, and can also be referred to as a length of the lens. As the telescopic degree becomes greater, and as the lens length becomes longer, the configuration enables to indicate more detailed information about the travelling environment around the vehicle. The wide angle degree is an index indicating a degree of a wide angle level, and can also be referred to as a width of an angle of view. As the wide angle degree becomes larger, and as the angle of view becomes wider, the configuration enables to indicate, not only the travelling environment around the subject vehicle, but also the travelling environment farther away.

Figure 4:
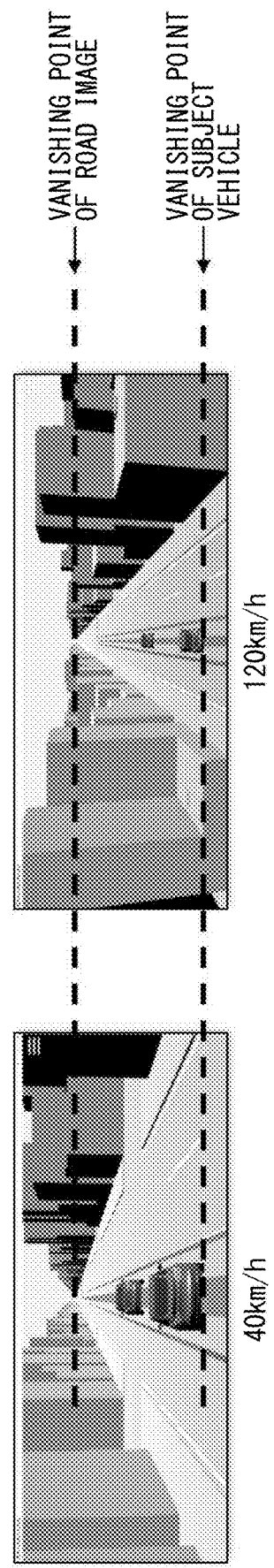
FIG. 4 is a view showing a rear end of the subject vehicle image and a vanishing point of a traveling road image.

Further, as shown in FIG. 4, the display control unit 17 fixes vehicle traveling direction coordinates of the rear end of the subject vehicle image in the display screen, regardless of the speed of the subject vehicle. That is, even when the vehicle speed changes, the position of the rear end of the vehicle image does not change. Further, as shown in FIG. 4, the display control unit 17 fixes vehicle traveling direction coordinates of a vanishing point of the traveling road image in the display screen regardless of the speed of the subject vehicle. That is, even, when the vehicle speed changes, the position of the vanishing point of the road image does not change. Note that the display control unit 17 computes the vehicle traveling direction coordinates in a Y coordinate. Herein, the width direction of the subject vehicle is the X coordinate direction, and the length direction of the subject vehicle is the Y coordinate direction.

Figure 5:
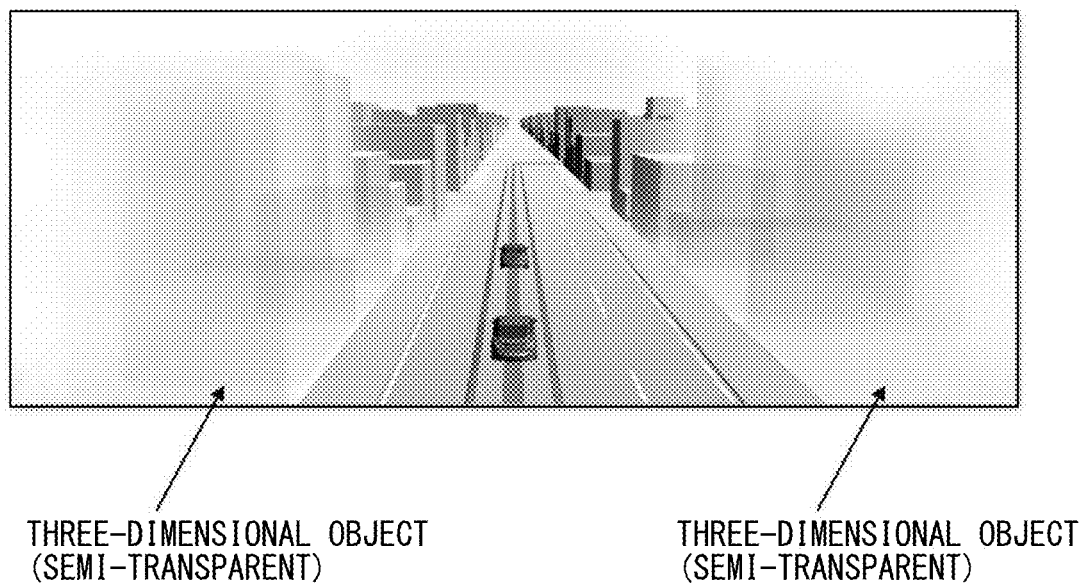
FIG. 5 is a view showing a mode that indicates a three-dimensional object image in a semi-transparent manner.

Furthermore, when the subject vehicle speed is low, the display control unit 17 causes the meter display 18 to display a three-dimensional object image in a three-dimensional shape. When the subject vehicle speed is high, the display control unit 17 causes the meter display 18 to display the three-dimensional object image in a semi-transparent manner as shown in FIG. 5. Instead of causing the meter display 18 to display the three-dimensional object image in the semi-transparent manner, the display control unit 17 may cause the meter display 18 to display the three-dimensional object image in a blurred manner.

(2) Function that Changes Display Mode According to Approach of the Subject Vehicle to Route Guidance Point.

Figure 6:
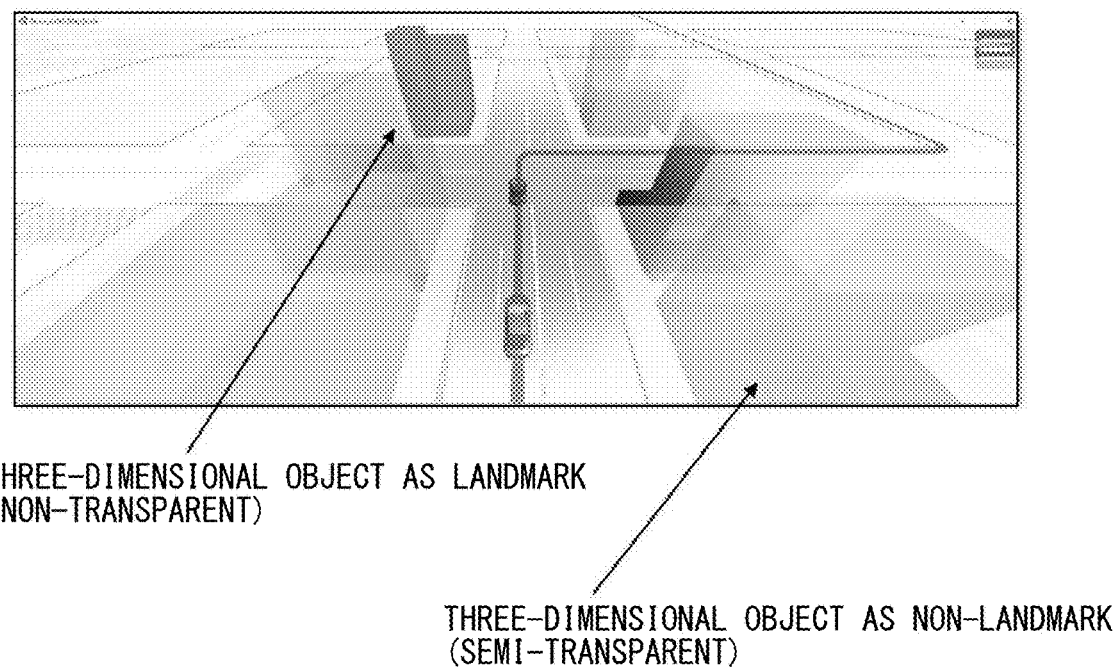
FIG. 6 is a view showing a mode that indicates a three-dimensional object image, which serves as a landmark, non-transparently, and indicates a three-dimensional object image, which does not serve as a landmark, in a semi-transparent manner.

Based on determination that the vehicle approaches the route guidance point, the display control unit 17 moves the vehicle traveling direction coordinates of the vanishing point of the traveling road image to a far distance in the display screen. Further, the display control unit 17 causes the meter display 18 to display a three-dimensional object image that serves as a landmark around the route guidance point by differentiating them from a three-dimensional object image that does not serve as a landmark. Specifically, as shown in FIG. 6, the display control unit 17 causes the meter display 18 to display the three-dimensional object image that serves as a landmark in a non-transparent manner, and causes the meter display 18 to display the three-dimensional object image that does not serve as a landmark in a translucent manner or in a blurred manner. Further, the display control unit 17 may cause the meter display 18 to display a three-dimensional object image that serves as a landmark in a three-dimensional shape, and may cause the meter display 18 to display a three-dimensional object image that does not serve as a landmark in a two-dimensional shape.

Figure 7:
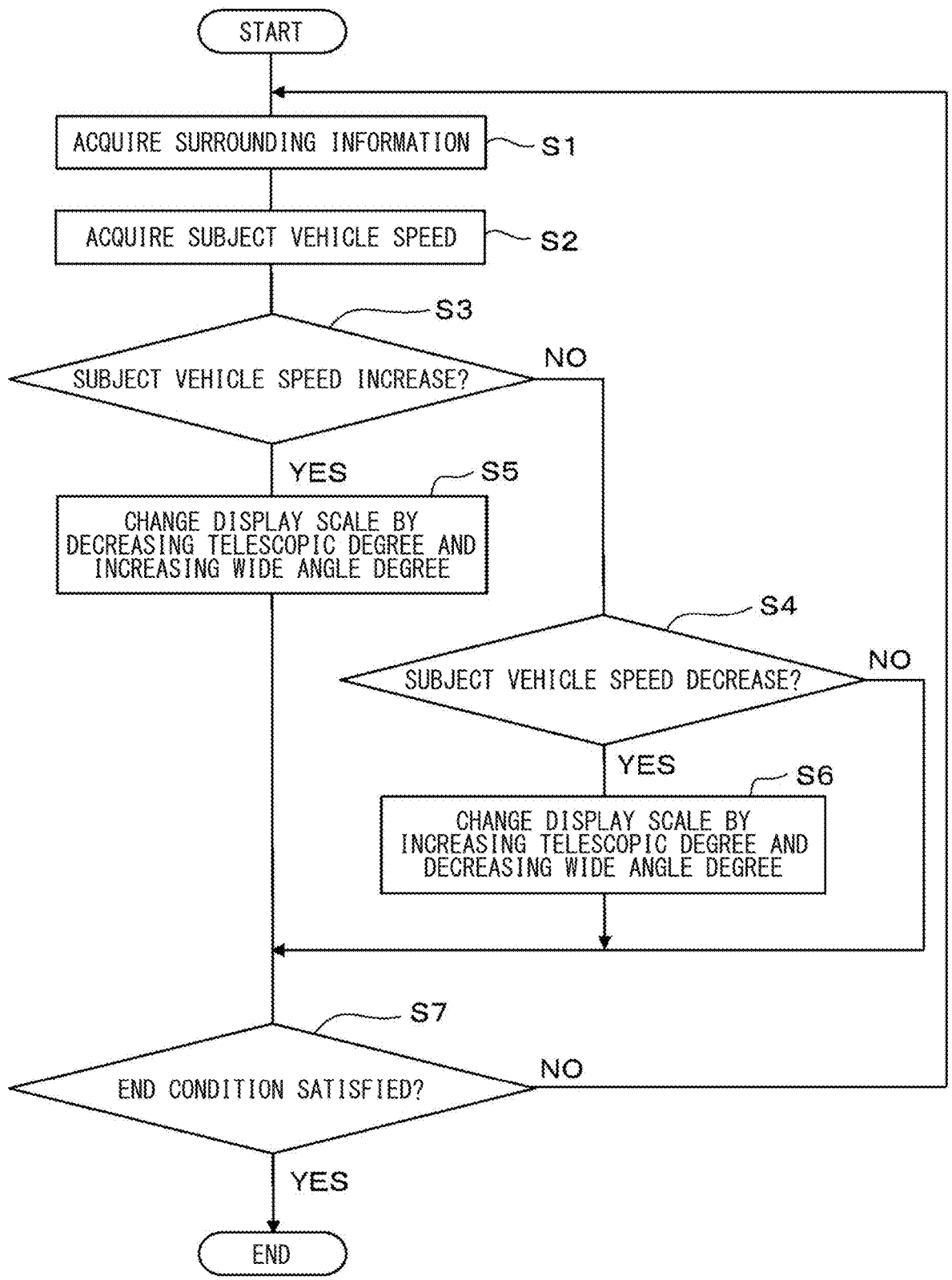
FIG. 7 is a flowchart showing a scale change processing.
Figure 8:
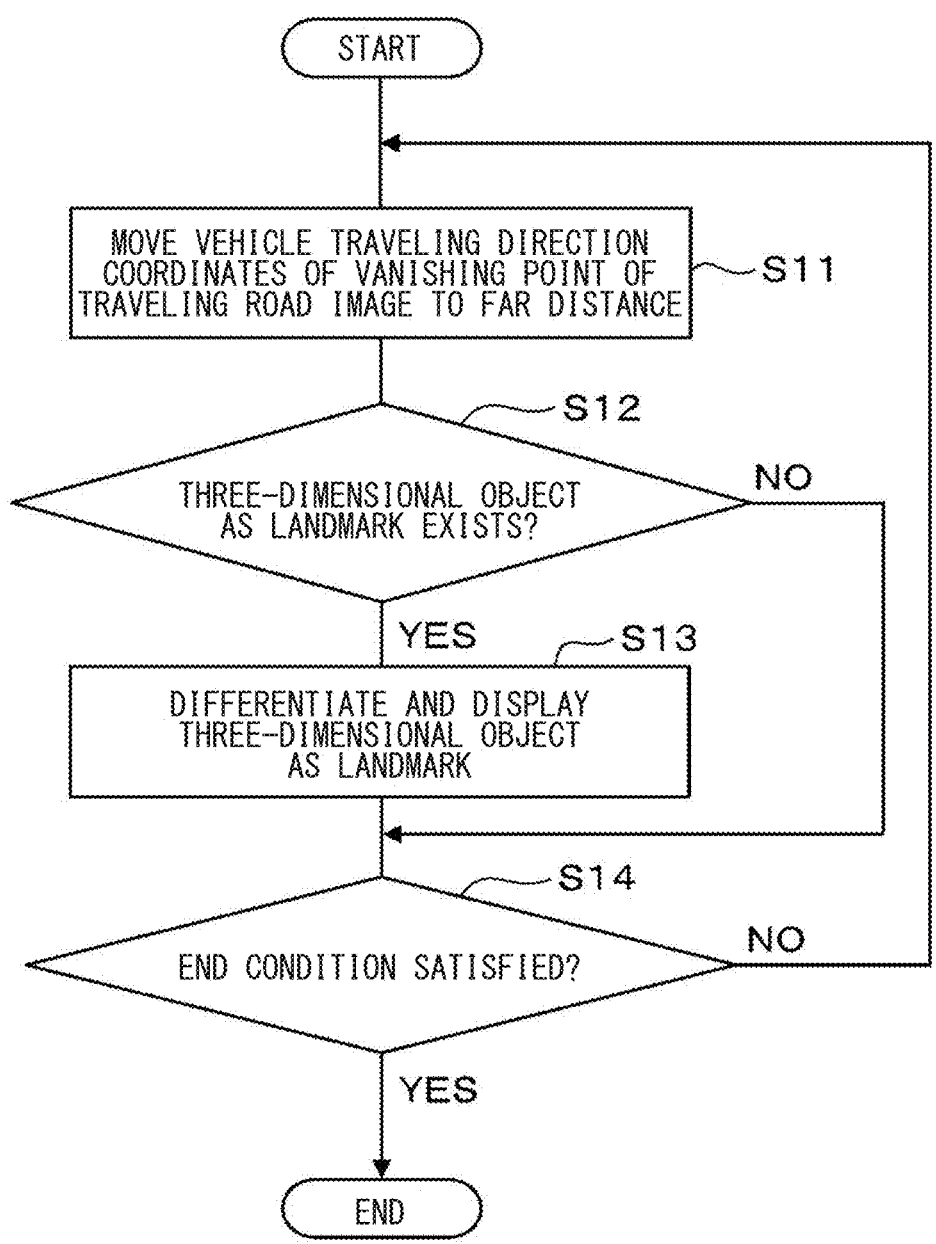
FIG. 8 is a flowchart showing a route guidance point approaching process.

A function of the configuration will be described with reference to FIGS. 7 to 8. Herein, as processes executed by the control unit 2, a scale change process and a route guidance point approaching process will be described.

(1) Scale Change Process

When the control unit 2 determines that a start condition for the scale change process is satisfied when, for example, an ignition is switched from off to on, the control unit 2 starts the scale change process. The start condition for the scale change process is not limited to, for example, the ignition that is switched from off to on, but may also be that the driver performs a predetermined operation to start the route guidance. When the control unit 2 starts the scale change process, the control unit 2 receives detection information transmitted from the surrounding monitoring sensor 4. The control unit 2 further acquires surrounding information around the subject vehicle (S1, corresponding to the surrounding information acquisition process). The control unit 2 further receives vehicle speed information transmitted from the travel control ECU 7. The control unit 2 further acquires subject vehicle speed (S2, corresponds to subject vehicle speed acquisition process).

The control unit 2, for example, compares the subject vehicle speed, which is most recently acquired, with the subject vehicle speed, which is acquired earlier than the most recently acquired subject vehicle speed (for example, several milliseconds before the most recently acquired subject vehicle speed), and determines whether the subject vehicle speed is increasing or decreasing (S3, S4). The control unit 2 determines that the vehicle speed is increasing (S3: YES), when, for example, the most recently acquired subject vehicle speed has increased relative to the previously acquired subject vehicle speed. In this case, the control unit 2 changes the display scale to decrease the telescopic degree and to increase the wide angle degree (S5, corresponding to display control process). At this time, the wide angle degree gradually increases, as the subject vehicle speed increases. In this way, the configuration enables the driver to gradually recognize not only the travelling environment around the vehicle but also the travelling environment to a far distance.

On the other hand, the control unit 2 determines that the subject vehicle speed is decreasing (S3: YES), when, for example, the most recently acquired subject vehicle speed has decreased relative to the most recently acquired subject vehicle speed. In this case, the control unit 2 changes the display scale to increase the telescopic degree and decrease the wide angle degree (S6, corresponding to display control process). At this time, the telephoto angle degree gradually increases, as the vehicle speed decreases. In this way, the configuration enables the driver to gradually recognize the detailed information about the travelling environment around the vehicle.

The control unit 2 determines whether a end condition for the scale change process is satisfied (S7). When the control unit 2 determines that the end condition for the scale change process is satisfied when, for example, the ignition is switched from on to off (S7: YES), the control unit 2 terminates the scale change process. The end condition for the scale change process is not limited to, for example, the ignition that is switched from on to off, but may also be that the driver performs a predetermined operation to terminate the route guidance. When, for example, the ignition remains on, and the control unit 2 determines that the end condition for the scale change process is not satisfied (S7: NO), the control unit 2 returns to step S1 described above and repeats step S1 and subsequent steps. That is, the control unit 2 continues to change the scale of the display in accordance with the increase and the decrease in the vehicle speed.

(2) Route Guidance Point Approaching Process

When the control unit 2 determines that the vehicle is approaching a route guidance point, the control unit 2 starts the route guidance point approach process. The control unit 2, when starting the route guidance point approach process, moves the vehicle traveling direction coordinates of the vanishing point of a travelling road image to a far distance (S11). The travelling road image indicates in the display screen the travelling road, on which the vehicle travels, in the surrounding image. The control unit 2 determines whether a three-dimensional object image serving as a landmark exists around the route guidance point (S12).

The control unit 2, based on determination that a three-dimensional object image serving as a landmark exists around the route guidance point (S12: YES), differentiates the three-dimensional object image that serves as the landmark from a three-dimensional object images that does not serve as a landmark. The control unit 2 causes the meter display 18 (S13) to display the three-dimensional object image. The control unit 2, as the differentiation, causes the meter display 18 to display the three-dimensional object image that serves as the landmark in a non-transparent manner and causes the meter display 18 to display the three-dimensional object image that does not serve as a landmark in a semi-transparent manner or in a blurred manner. The control unit 2, as the differentiation, may cause the meter display 18 to display the three-dimensional object image that serves as the landmark in a three-dimensional shape and may cause the meter display 18 to display the three-dimensional object image that does not serve as a landmark in a two-dimensional shape.

The control unit 2 determines whether the end condition for the route guidance point approach process is satisfied (S14). The control unit 2 terminates the route guidance point approach process, for example, based on determination that the subject vehicle has reached the route guidance point, and the end condition for the route guidance point approach process is satisfied (S14: YES). The control unit 2 returns to step S11 described above, for example, based on determination that the subject vehicle has not reached the route guidance point, and the termination condition for the route guidance point approach process is not satisfied (S14: NO). Thus, the control unit 2 repeats step S11 and subsequent steps.

As described above, according to the present embodiment, the following operational effects can be produced.

The vehicle display control device 1, when the subject vehicle speed is low, sets the display scale to telescopic and causes the meter display 18 to display the surrounding image and the subject vehicle image. The configuration enables to present detailed information about the traveling environment around the vehicle to the driver. When the subject vehicle speed is high, in a case where the display scale is set to the telescopic, an issue may occur. For example, the display of the surrounding image may move quickly. For example, the forward display distance becomes short, and enough leeway cannot be allowed for the driving operation.

It is noted that, when the subject vehicle speed is high, the above configuration sets the display scale to the wide angle and causes the meter display 18 to display the surrounding image and the subject vehicle image. This configuration enables to reduce irritation caused by movement of the display of the surrounding image and ensure the forward display distance as a long distance. This example enables to present, in addition to the traveling environment around the subject vehicle, the traveling environment at a distance to the driver. This example enables to present the travelling environment around the subject vehicle appropriately to the driver.

The configuration linearly changes the display scale. The configuration decreases the telescopic degree and increases the wide angle degree according to increase in the subject vehicle speed. The configuration increases the telescopic degree and decreases the wide angle degree according to decrease in the subject vehicle speed. The configuration gradually increases the wide angle degree according to increase in the subject vehicle speed, thereby to enable to gradually present the travelling environment in a far distance to the driver. The configuration gradually increases the telescopic degree as the vehicle speed decreases, thereby to enable to gradually present detailed information about the travelling environment around the vehicle to the driver. Thus, the configuration enables to present the driver with a natural change similarly to that the driver sees in the real world.

In a case where a display reference is not fixed when the display scale is linearly changed, the driver may feel a sense of anxiety. The configuration fixes the vehicle's traveling direction coordinates of each of the rear end of the subject vehicle image and the vanishing point of the traveling road image, regardless of the speed of the subject vehicle. The configuration sets the display reference, thereby to enable to present more natural change to the driver.

The configuration causes the meter display 18 to display the three-dimensional object image in in a three-dimensional shape when the subject vehicle speed is low. The configuration sets the display scale to the telescopic and furthermore displays the three-dimensional object image in the three-dimensional shape, thereby to enable to more appropriately present detailed information about the travelling environment around the subject vehicle to the driver.

The configuration causes the meter display 18 to display the three-dimensional object image in a semi-transparent manner or in a blurred manner, when the subject vehicle s speed is high. The configuration sets the display scale to the wide angle and further displays the three-dimensional object image in the semi-transparent manner or in the blurred manner, thereby to enable to reduce irritation caused by movement of the display of the peripheral image.

The configuration moves the vehicle traveling direction coordinates of the vanishing point of the driving road image to a far distance, when the subject vehicle approaches a route guidance point. The configuration enables to present a detailed positional relationship between the subject vehicle and the route guidance point to the driver. When the subject vehicle speed is high, the configuration sets the display scale to the wide angle when approaching the route guidance point, thereby to enable to present information in a wide range to the driver. When the vehicle speed is low, the configuration sets the display scale to the telescopic when approaching the route guidance point, thereby to enable to present detailed information about the traveling environment around the vehicle to the driver.

The configuration differentiates the three-dimensional object image, which serve as a landmark around the route guidance points, from the three-dimensional objects image, which does not serve as a landmark, and causes the meter display 18 to display the three-dimensional object image. The configuration emphasizes the three-dimensional object image, which serves as a landmark, thereby to enable to present explicit route guidance to the driver. As the differentiation, the configuration displays the three-dimensional object image, which serves as a landmark, in a non-transparent manner and displays the three-dimensional object image, which does not serve as a landmark, in a semi-transparent or in a blurred manner. In this way, the configuration enables to emphasize the three-dimensional object image that serves as a landmark due to the difference in transparency. As the differentiation, the configuration displays the three-dimensional object image, which serves as a landmark, in a three-dimensional shape and displays the three-dimensional object image, which does not serve as a landmark, in a two-dimensional shape. In this way, the configuration enables to emphasize the three-dimensional object image that serves as a landmark due to the difference in shape. The differentiation may use difference in color.

Although the present disclosure has been described in accordance with the examples, it is understood that the present disclosure is not limited to such examples or structures. The present disclosure encompasses various modifications and variations within the scope of equivalents. Additionally, various combinations and configurations, as well as other combinations and configurations including more, less, or only a single element, are within the scope and spirit of the present disclosure.

The control unit and the method described in the present disclosure may be implemented by a dedicated computer provided by forming a processor and a memory programmed to execute one or more functions embodied by a computer program. Alternatively, the control unit and the method described in the present disclosure may be implemented by a dedicated computer provided by forming a processor with one or more dedicated hardware logic circuits. Alternatively, the control unit and the method described in the present disclosure may be implemented by one or more dedicated computers formed by a combination of a processor and a memory programmed to execute one or more functions and a processor configured by one or more hardware logic circuits. The computer program may also be stored on a computer readable and non-transitory tangible recording medium as instructions executed by a computer.

What is claimed is:

1. A vehicle display control device comprising:
   a surrounding information acquisition unit configured to acquire surrounding information around a subject vehicle;
   a vehicle speed acquisition unit configured to acquire a subject vehicle speed; and
   a display control unit configured to cause a display device to display a surrounding image indicating the surrounding information and a subject vehicle image indicating the subject vehicle, wherein
   the display control unit is configured to set a telescopic degree, which corresponds to a length of a lens, and a wide angle degree, which corresponds to a width of an angle of view, and
   the display control unit is configured to
     set a display scale by relatively increasing the telescopic degree and relatively decreasing the wide angle degree, when the subject vehicle speed is low, and cause the display device to display the surrounding image and the subject vehicle image, and set the display scale by relatively increasing the wide angle degree and relatively decreasing the telescopic degree, when the subject vehicle speed is high, and cause the display device to display the surrounding image and the subject vehicle image.

2. The vehicle display control device according to claim 1, wherein
the display control unit is configured to linearly change the display scale, and
the display control unit is configured to
decrease the telescopic degree and increase the wide angle degree in response to increase in the subject vehicle speed, and
increase the telescopic degree and decrease the wide angle degree in response to decrease in the subject vehicle speed.

3. The vehicle display control device according to claim 1, wherein
the display control unit is configured to fix vehicle traveling direction coordinates of a rear end of the subject vehicle image in a display screen regardless of the subject vehicle speed.

4. The vehicle display control device according to claim 1, wherein
the surrounding image includes a traveling road image indicating a traveling road on which the subject vehicle travels, and
the display control unit is configured to fix vehicle traveling direction coordinates of a vanishing point of the traveling road image in a display screen, regardless of the subject vehicle speed.

5. The vehicle display control device according to claim 4, further comprising:
an approach determination unit configured to determine whether the subject vehicle approaches a route guidance point, wherein
the display control unit is configured to in response to determination that the subject vehicle approaches the route guidance point, move the vehicle traveling direction coordinates of the vanishing point of the traveling road image in the display screen to a far distance.

6. The vehicle display control device according to claim 5, wherein
the surrounding image includes a three-dimensional object image indicating a three-dimensional object, and
the display control unit is configured to differentiate an image of a specific three-dimensional object around the route guidance point from an image of a three-dimensional object excluding the specific three-dimensional object and cause the display device to display the image of the specific three-dimensional object.

7. The vehicle display control device according to claim 6, wherein
the display control unit is configured to cause the display device to display the image of the specific three-dimensional object around the route guidance point in a non-transparent manner and cause the display device to display the image of the three-dimensional object excluding the specific three-dimensional object in a semi-transparent manner or in a blurred manner.

8. The vehicle display control device according to claim 6, wherein
the display control unit is configured to cause the display device to display the image of the specific three-dimensional object around the route guidance point in a three-dimensional shape and cause the display device to display the image of the three-dimensional object excluding the specific three-dimensional object in a two-dimensional shape.

9. The vehicle display control device according to claim 1, wherein
the surrounding image includes a three-dimensional object image indicating a three-dimensional object, and
the display control unit is configured to, when the subject vehicle speed is low, cause the display device to display the three-dimensional object image in a three-dimensional shape.

10. The vehicle display control device according to claim 1, wherein
the surrounding image includes a three-dimensional object image indicating a three-dimensional object, and
the display control unit is configured to, when the subject vehicle speed is high, cause the display device to display the three-dimensional object image in a semi-transparent manner or in a blurred manner.

11. A non-transitory computer-readable medium storing a vehicle display control program comprising instructions configured to, when executed by a processor, to cause the processor to:
acquire surrounding information around a subject vehicle;
acquire a subject vehicle speed;
set a display scale by relatively increasing a telescopic degree, which corresponds to a length of a lens, and relatively decreasing a wide angle degree, which corresponds to a width of an angle of view, when the subject vehicle speed is low, and cause a display device to display a surrounding image indicating the surrounding information and a subject vehicle image indicating the subject vehicle; and
set the display scale by relatively increasing the wide angle degree and relatively decreasing the telescopic degree, when the subject vehicle speed is high, and cause the display device to display the surrounding image and the subject vehicle image.

12. A vehicle display control device comprising:
at least one processor; and
at least one memory storing instructions configured to, when executed by the processor, cause the at least one processor to:
acquire surrounding information around a subject vehicle;
acquire a subject vehicle speed;
set a display scale by relatively increasing a telescopic degree, which corresponds to a length of a lens, and relatively decreasing a wide angle degree, which corresponds to a width of an angle of view, when the subject vehicle speed is low;
set the display scale by relatively increasing the wide angle degree and relatively decreasing the telescopic degree, when the subject vehicle speed is high; and
cause a display device to display a surrounding image indicating the surrounding information and a subject vehicle image indicating the subject vehicle.

* * * * *